United States Patent
Araya

(10) Patent No.: US 8,526,051 B2
(45) Date of Patent: Sep. 3, 2013

(54) NETWORK FILE PROCESSING SYSTEM FOR SENDING MULTICAST ACCEPTANCE REQUESTS FOR TRANSMISSION OF IMAGE DATA VIA A NETWORK

(75) Inventor: Takeshi Araya, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 976 days.

(21) Appl. No.: 12/388,991

(22) Filed: Feb. 19, 2009

(65) Prior Publication Data

US 2009/0303527 A1    Dec. 10, 2009

(30) Foreign Application Priority Data

Jun. 10, 2008 (JP) .................................. 2008-151239

(51) Int. Cl.
*G06F 3/12* (2006.01)
(52) U.S. Cl.
USPC .......................... 358/1.16; 358/1.15; 707/608
(58) Field of Classification Search
USPC ................. 358/1.15, 1.16; 707/608
See application file for complete search history.

(56) References Cited

U.S. PATENT DOCUMENTS

| | | | | |
|---|---|---|---|---|
| 5,754,308 A * | 5/1998 | Lopresti et al. | | 358/403 |
| 7,188,292 B2 * | 3/2007 | Cordina et al. | | 714/748 |
| 7,224,491 B2 * | 5/2007 | Shinchi et al. | | 358/400 |
| 2003/0074632 A1* | 4/2003 | Marks et al. | | 715/500 |
| 2006/0045386 A1* | 3/2006 | Fukuoka et al. | | 382/305 |
| 2008/0130884 A1* | 6/2008 | Matsumoto et al. | | 380/200 |

FOREIGN PATENT DOCUMENTS

JP    2005-039411    2/2005

* cited by examiner

Primary Examiner — Peter K Huntsinger
(74) Attorney, Agent, or Firm — K&L Gates LLP

(57) ABSTRACT

A network file processing system comprising: a scanner device connected to a network, for reading a document and generating image data; and a plurality of file servers connected to the network, each having an area to save data to, in which: the scanner device comprising: an acceptance request issuance unit for sending multicast acceptance requests for the image data to the plurality of file servers across the network after generating the image data; a data transmission unit for transmitting the image data to at least one of the plurality of file servers that has returned a reading response; and a related information saving unit for saving related information associated with the image data.

16 Claims, 4 Drawing Sheets

NETWORK FILE PROCESSING SYSTEM FOR SENDING MULTICAST ACCEPTANCE REQUESTS FOR TRANSMISSION OF IMAGE DATA VIA A NETWORK

INCORPORATION BY REFERENCE

This application is based upon and claims the benefit of priority from the corresponding Japanese Patent Application Non 2008-151239, filed Jun. 10, 2008, the entire contents of which is incorporated herein by reference.

BACKGROUND

1. Field of the Invention

The present invention relates to network file processing systems for saving or reading to or from a network, image data from a document read by using a scanner device that is connected to the network, and to scanner devices.

2. Description of the Related Art

Heretofore, image processing systems have been used wherein a document box is generated on a hard drive included in an image forming apparatus connected to a network. Document boxes are distributed across the network and image data is saved thereto. In this system, a management table that has been previously stored on a management server, and the management table includes an ID and a box name of each of the document boxes that are on the network as well as user identification information indicating the owner of each document box. When a user wants to access necessary image data, the user specifies a document box in which the data is saved by acquiring information including the ID and the box name of the document box from the management server.

In such systems, it is necessary to previously store document boxes on given hard drives and assign the individual ID and box name thereto. This complicates setup operations that are necessary before the system can be used. In addition, in order to access the desired image data, it is necessary for a user to acquire information on the location of the document box from the management server and then to specify the document box, which requires time and labor of the user.

SUMMARY

The present invention provides systems and devices capable of easily saving image data across a network and simplifying the use of the image data saved to the network.

To this end, the present invention relates to network file processing systems comprising: a scanner device connected to a network, for reading documents and generating image data; and a plurality of file servers connected to the network, each having an area to save data to.

In the network file processing system according to an embodiment of the present invention:

the scanner device comprises: an acceptance request issuance unit for sending multicast acceptance requests for the image data to a plurality of file servers across the network after generating the image data; a data transmission unit for transmitting the image data to at least one of the plurality of file servers that has returned a reading response; and a related information saving unit for saving related information associated with the image data; and the plurality of file servers each comprise: a response unit for returning the reading response in response to the acceptance request; and a data saving unit for saving the image data transmitted via the network into an area to save data to.

In the file processing system according to an embodiment of the present invention, a request to save image data is sent to the plurality of file servers connected to the network. The image data is saved to any one of the file servers that has responded to the request. This makes it unnecessary to previously assign a document box and information including its ID and box name to each of the plurality of file servers. On the other hand, the scanner device only retains information related to the image data. The scanner device does not need to store information indicating which file server on the network the image data has been stored in. Thus, the burden on system management performed by the hardware can be reduced.

Additional features and advantages are described herein, and will be apparent from the following Detailed Description and the figures.

DETAILED DESCRIPTION

Figure 1:
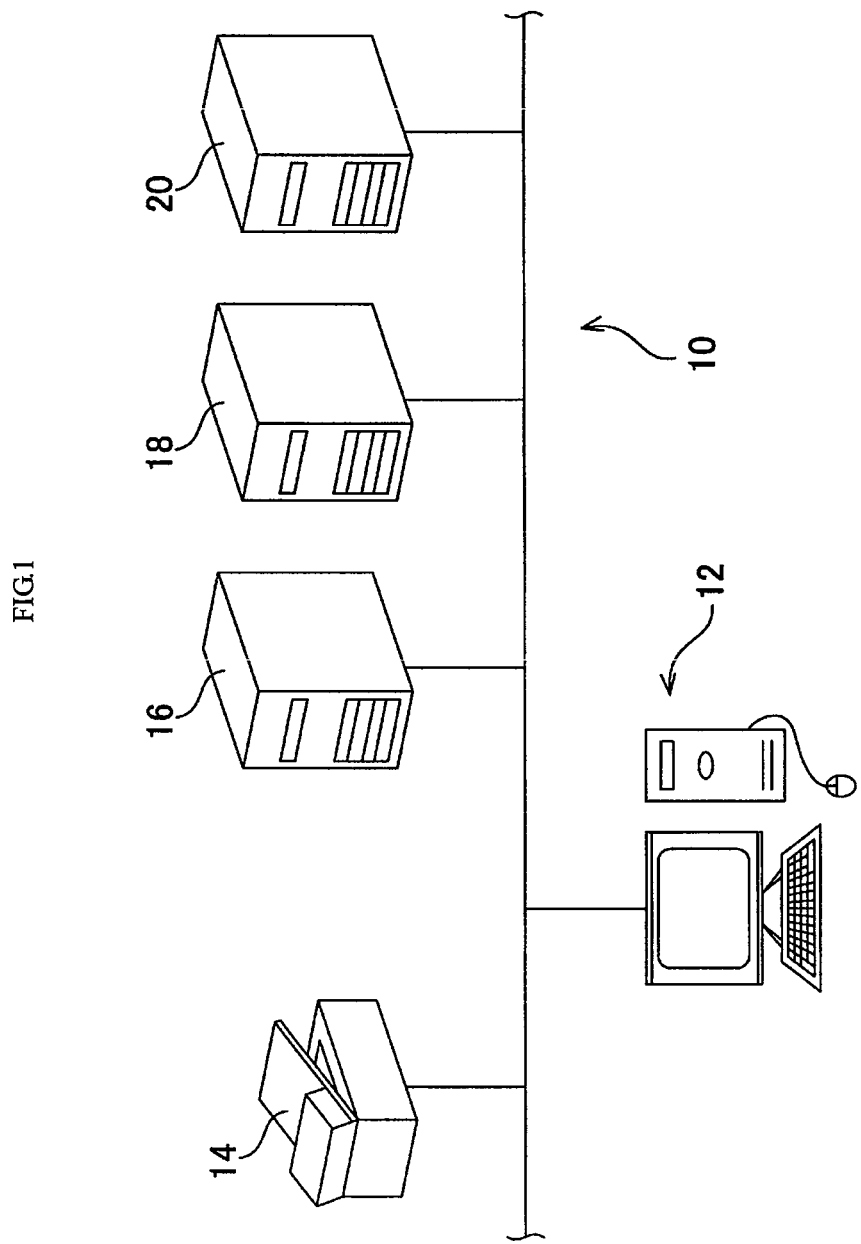
FIG. 1 is a schematic diagram illustrating an example of a network to which a file processing system according to an embodiment of the present invention is used.

FIG. 1 is a schematic diagram illustrating the configuration of an example of a network 10 to which a file processing system according to an embodiment of the present invention can be used. By way of example, the network 10 is a network infrastructure using a local area network (LAN). Connected to the network 10 are, for example, a personal computer (hereinafter, referred to as "PC") 12 to be used by a user, a scanner 14 that is compatible with a network protocol, a first file server 16, a second file server 18, and a third file server 20. It should be noted that additional file servers may be provided in addition to the illustrated file servers. Further, additional PCs and scanners may be provided in addition to the PC 12 and the scanner 14 that are illustrated in FIG. 1.

Figure 2:
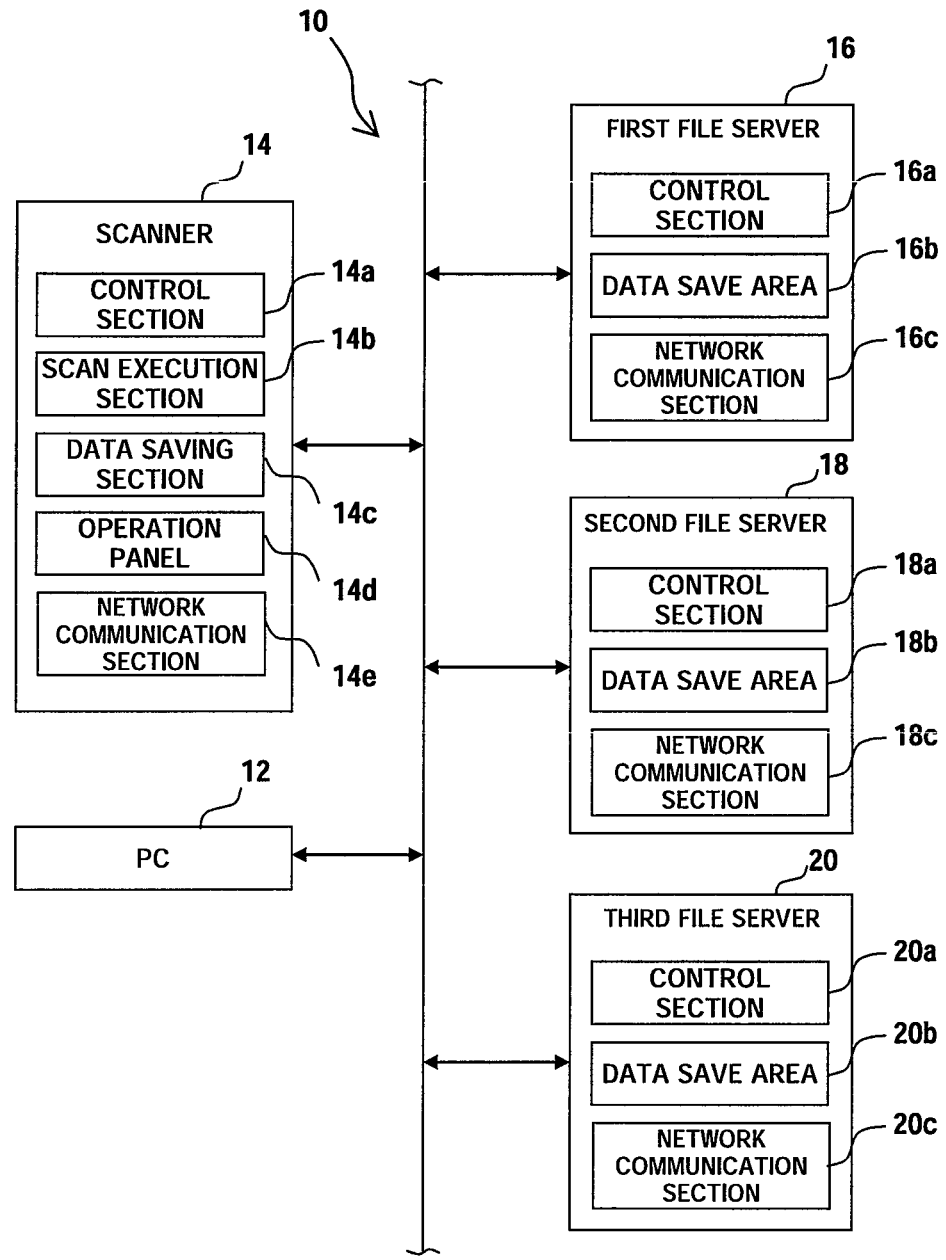
FIG. 2 is a block diagram schematically illustrating functional configurations of a scanner and file servers according to the embodiment of the present invention.

FIG. 2 is a block diagram schematically illustrating the functional configurations of the scanner 14 and the file servers 16, 18, and 20. Hereinafter, description is made of each of the functional configurations.

(Scanner)

The scanner 14 includes a control section 14a, a scan execution section 14b, a data saving section 14c, an operation panel 14d, and a network communication section 14e. The scan execution section 14b implements the basic function of the scanner 14, and includes a reading glass, reading head, an optical camera, an automatic document feeder, and a driver mechanism therefor.

The scanner 14 uses the scan execution section 14b to read a document (for example, paper medium such as printed matter or photograph). The scan execution section 14b executes the reading operation, and generates image data obtained by imaging a document. The generated image data is stored in the data saving section 14c. The data saving section 14c represents a section for reading a recording medium such as nonvolatile memory or a hard drive. The operation panel 14*d* is used to locally operate the scanner 14, and specifically includes operation keys and switches.

The network communication section 14*e* is a network adapter for connecting the scanner 14 to the network 10. A driver therefor is installed in, for example, the control section 14*a*. The control section 14*a* functions as a microcomputer, and is built in the scanner 14 in the form of, for example, an electronic circuit board packaged with a processor such as a central processing unit (CPU) and memories such as read only memory (ROM) and random access memory (RAM). The control section 14*a* functions not only to receive input from the operation panel 14*d* and control communications performed by the network communication section 14*e*, but also control the reading operation performed by the scan execution section 14*b*.

(File Servers)

The three file servers 16, 18, and 20 have the same configuration, and are described herein by way of example by referring to the first file server 16. The first file server 16 comprises a control section 16*a*, a data save area 16*b*, and a network communication section 16*c*. The control section 16*a* causes the first file server 16 to function as a server computer, and is, for example, not only an electronic circuit board packaged with a processor such as a CPU and memories such as a ROM and a RAM, but also built in the first file server 16 with a large-capacity hard drive combined therewith. The hard drive has basic software (operating system) installed thereon, and the control section 16*a* executes the basic software to thereby cause the first file server 16 to function as the server computer.

The data save area 16*b* is located within, for example, the hard drive and the control section 16*a* uses a part of a storage area of the hard drive as the data save area 16*b*. The network communication section 16*c* is a network adapter for connecting the first file server 16 to the network 10. The control section 16*a* not only controls communications performed by the network communication section 16*c* but also controls operations such as writing or erasure of image data with respect to the data save area 16*b*.

Operation Example

Next, an example of the operation of the scanner 14 and the file servers 16, 18, and 20 in the network 10 will be provided.

(Case of Saving Data)

Figure 3:
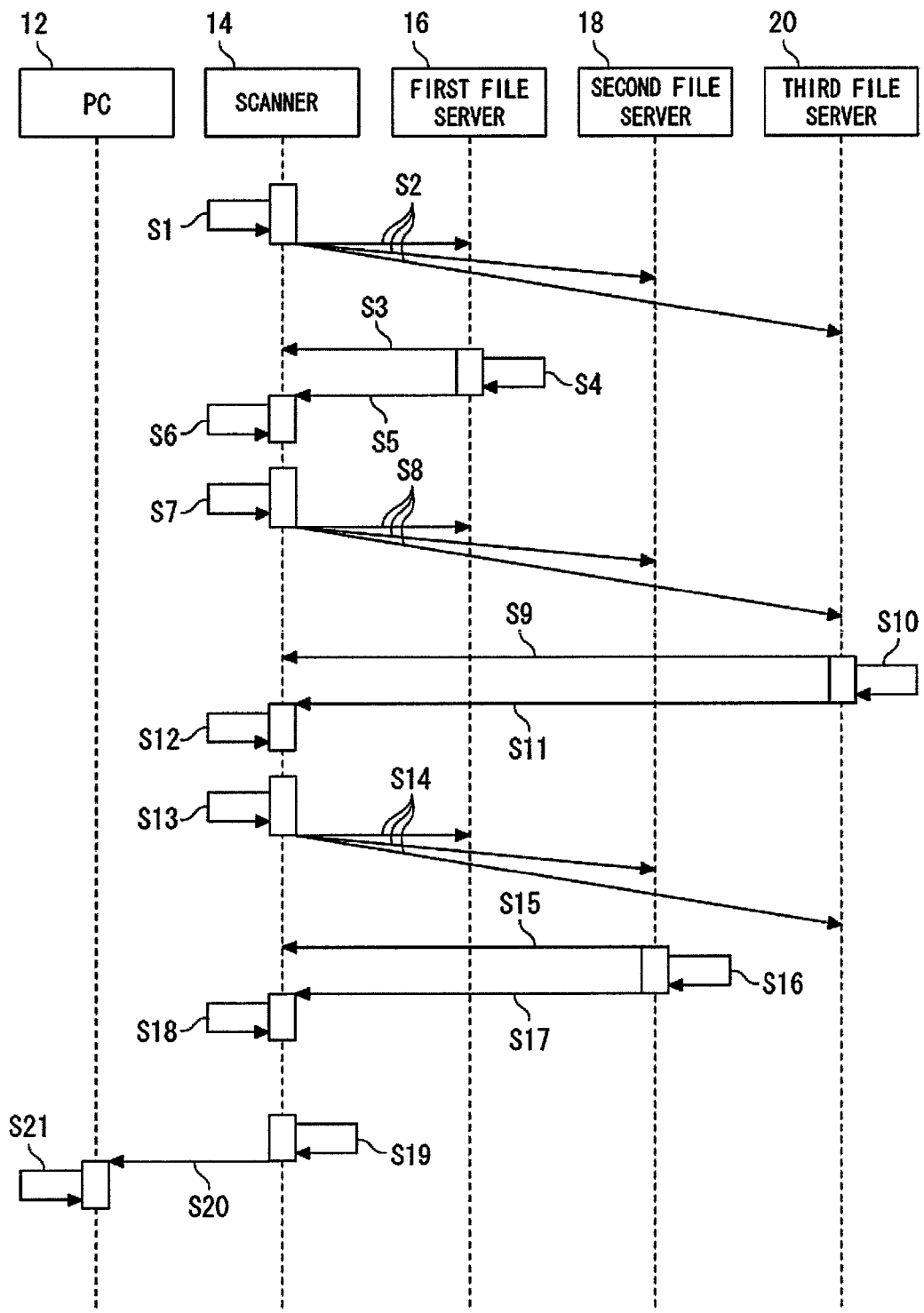
FIG. 3 is a sequence diagram illustrating an example of an operation of saving image data read by the scanner according to the embodiment of the present invention.

FIG. 3 is a sequence diagram illustrating an example of the operation where image data read by the scanner 14 is saved to one of the file servers 16, 18, and 20. Hereinafter, the description is made according to a procedure of the operation.

Step S1: First, the scanner 14 executes the operation of reading a document (for example, first sheet). After the reading operation, the scanner 14 generates image data on the document (first sheet), and temporarily stores the image data into the data saving section 14*c*.

Step S2: Then, the scanner 14 sends multicast image acceptance requests to the servers 16, 18, and 20 via the network 10.

Step S3: In response to the image acceptance request received from the scanner 14, for example, the first file server 16 returns an image reading response. Note that which of the plurality of file servers 16, 18, and 20 is the first to return the response varies depending on communication circumstances and operational status of the file servers 16, 18, and 20 at the time. Messages exchanged across the network 10, including the above-described image acceptance request and image reading response, are created based on a predetermined protocol, for example, a hypertext transfer protocol (HTTP) or a simple object access protocol (SOAP).

Step S4: The scanner 14 transmits the image data (first sheet) to the first file server 16 that has returned the image reading response. The first file server 16 saves the image data (first sheet) transmitted from the scanner 14 into the data save area 16*b*. At this time, the image data saved by the first file server 16 is associated with at least a document name and a page number. That is, the first file server 16 saves the image data with the document name and the page number as a file name (for example, "user1doc_page1.bmp") (the same holds true of the second file server 18 and the third file server 20). Of course, the image data may be associated with the document name and the page number by a different method other than the above-described method.

Step S5: After the image data (first sheet) is saved, the first file server 16 sends an image deletion notification to the scanner 14.

Step S6: The scanner 14, which has received the image deletion notification, deletes the image data (first sheet) stored in the data saving section 14*c*. Further, the scanner 14 stores meta information associated with the image data into the data saving section 14*c*. The meta information includes information related to the document on which the reading operation has been performed, for example, a size (for example, A4), a color mode (full-color or monochrome), and a page number.

After this sequence, the process of saving the image data of the first sheet across the network 10 ends.

Step S7: Subsequently, the scanner 14 reads a document (for example, second sheet). Upon execution of the reading operation, the scanner 14 generates image data on the document (second sheet), and temporarily stores the image data into the data saving section 14*c*.

Step S8: Then, the scanner 14 sends multicast image acceptance requests (second sheet) to the file servers 16, 18, and 20 via the network 10.

Step S9: In response to the image acceptance request received from the scanner 14, for example, the third file server 20 returns the image reading response.

Step S10: In this scenario, the scanner 14 transmits the image data (second sheet) to the third file server 20. The third file server 20 saves the image data (second sheet) transmitted from the scanner 14 into the data save area 20*b*. The image data saved by the third file server 20 is associated with at least a document name and a page number.

Step S11: After finishing saving the image data (second sheet), the third file server 20 sends an image deletion notification to the scanner 14.

Step S12: The scanner 14, which has received the image deletion notification, deletes the image data (second sheet) stored in the data saving section 14*c*. The scanner 14 stores meta information associated with the image data of the document (second sheet) into the data saving section 14*c*.

After this sequence, the process of saving the image data of the second sheet across the network 10 ends.

Step S13: Subsequently, the scanner 14 performs the step of reading a document (for example, third sheet). Upon reading operation, the scanner 14 generates image data on the document (third sheet), and temporarily stores the image data into the data saving section 14*c*.

Step S14: Then, the scanner 14 sends multicast image acceptance requests (third sheet) to the file servers 16, 18, and 20 via the network 10 as in the previously described steps.

Step S15: In response to the image acceptance request received from the scanner 14, for example, the second file server 18 returns the image reading response.

Step S16: The scanner 14 transmits the image data (third sheet) to the second file server 18 as in the above-described steps. The second file server 18 saves the image data transmitted from the scanner 14 into the data save area 18b. The image data saved by the second file server 18 is associated with at least a document name and a page number.

Step S17: After finishing saving the image data (third sheet), the second file server 18 sends the image deletion notification to the scanner 14.

Step S18: The scanner 14, which has received the image deletion notification, deletes the image data (third sheet) stored in the data saving section 14c. The scanner 14 stores meta information associated with the image data of the document (third sheet) into the data saving section 14c.

After the above-described steps, the process of saving the image data of the third sheet across the network 10 ends.

Step S19: After finishing reading all of the scheduled documents and saving the image data, the scanner 14 restructures the meta information that has been saved. The restructured meta information includes additional information on the read document, for example, a document name, the date and time it was saved, an owner name, and a total page number.

Step S20: The scanner 14 provides the meta information reorganized on a job basis to the PC 12 via the network 10.

Step S21: The PC 12 performs, for example, an application for management to save the job-basis meta information provided by the scanner 14. The user can view the meta information on the screen of the PC 12 and make desired selections by using a mouse or the like.

The scanner 14 does not need to specify any of the file servers 16, 18, and 20 in particular to send the image acceptance request. This makes it possible to simplify the processes performed by the scanner 14.

(Case of Using Data)

Next, an example of an operation wherein the user uses the image data through the PC 12 will be described.

Figure 4:
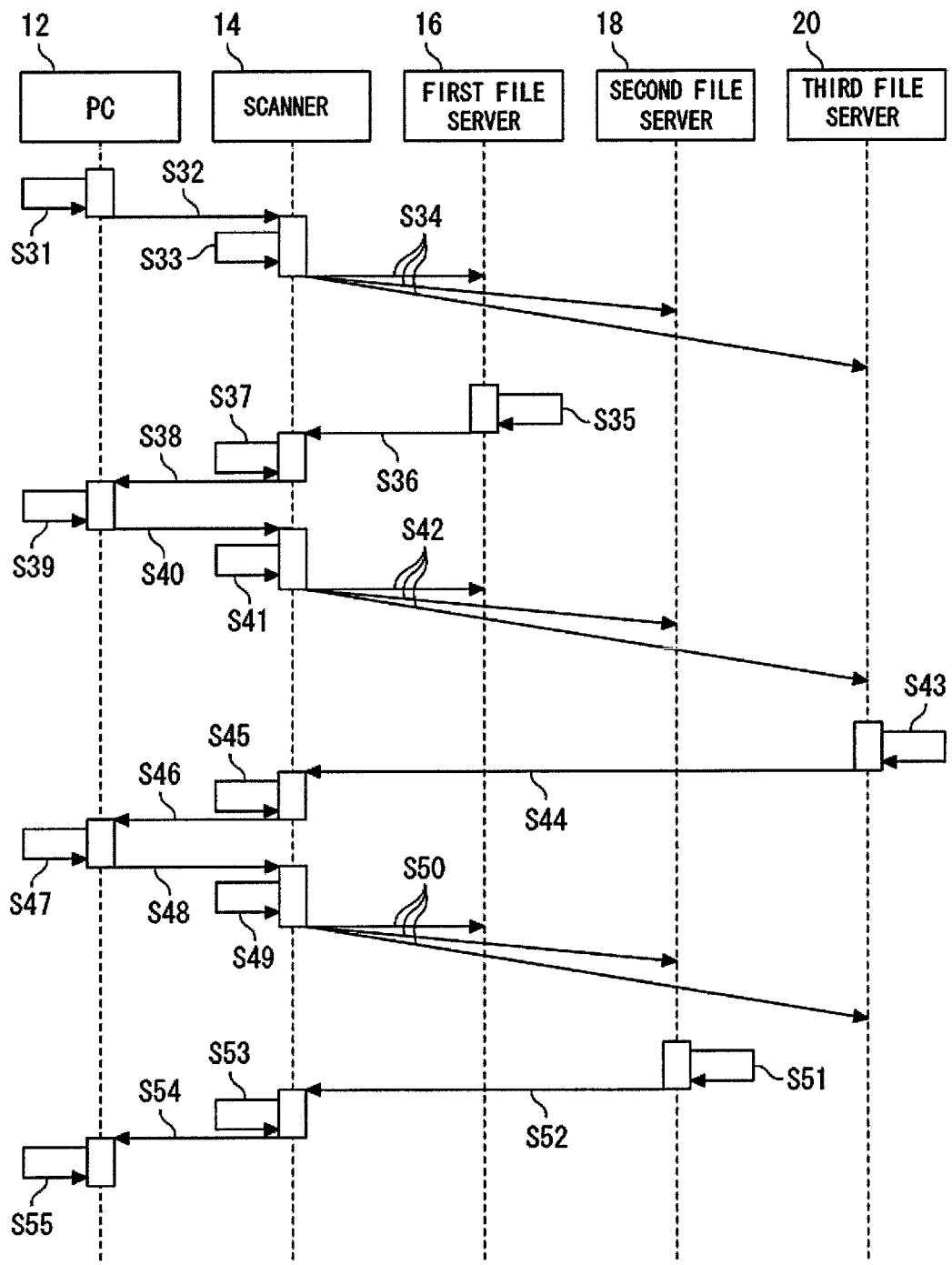
FIG. 4 is a sequence diagram illustrating an example of an operation where a user uses the image data distributively saved across the network according to the embodiment of the present invention.

FIG. 4 is a sequence diagram illustrating an example where the user uses the image data saved on the file servers 16, 18, and 20. Hereinafter, the description is made according to a procedure of the operation.

Step S31: For example, while executing the above-described application for management, the PC 12 receives an image acquisition operation from the user. The image acquisition operation is performed, for example, when the user specifies the page number (sheet number) of the image data desired by the user on the screen.

Step S32: For example, when the user specifies the first sheet of the image data, in response thereto, the PC 12 notifies the scanner 14 of an image acquisition request for the first sheet of the image data.

Step S33: Upon receipt of the image acquisition request, the scanner 14 starts an image transmission process based on the image acquisition request. The image transmission process is stored in, for example, the ROM of the control section 14a.

Step S34: Subsequently, the scanner 14 sends multicast image transmission requests for the first sheet to the file servers 16, 18, and 20 via the network 10. The image transmission request includes meta information on the necessary image data.

Step S35: Based on the meta information included in the image transmission request transmitted from the scanner 14, the first file server 16, in which the image data (first sheet) corresponding thereto is saved, starts the image transmission process. The image transmission process is stored in, for example, the ROM of each of the control sections 16a, 18a, and 20a.

Step S36: The first file server 16 transmits the image data (first sheet) to the scanner 14.

Step S37: Upon receipt of the image data (first sheet) via the network 10, the scanner 14 compares the image data with, for example, the meta information to confirm that the image data is the requested image.

Step S38: Then, the scanner 14 provides (transmits) the requested image data (first sheet) to the PC 12.

Step S39: The PC 12 processes the provided image data (first sheet) on the application for management, and, for example, displays the image data on the screen or displays the image data in the form of an icon. Accordingly, the user uses the PC 12 to view the desired image data (first sheet).

Step S40: Subsequently, based on the user's operation, the PC 12 notifies the scanner 14 of an image acquisition request for the second sheet of the image data.

Step S41: Upon receipt of the second sheet of the image acquisition request, the scanner 14 again executes the image transmission process.

Step S42: Subsequently, the scanner 14 sends multicast image transmission requests for the second sheet to the file servers 16, 18, and 20 via the network 10.

Step S43: Based on the meta information included in the image transmission request transmitted from the scanner 14, the third file server 20, in which the image data (second sheet) corresponding thereto is saved, starts the image transmission process.

Step S44: The third file server 20 transmits the image data (second sheet) to the scanner 14.

Step S45: The scanner 14 confirms that the image data (second sheet) received via the network 10 is the requested image.

Step S46: Then, the scanner 14 provides (transmits) the requested image data (second sheet) to the PC 12.

Step S47: The PC 12 processes the provided image data (second sheet) on the application for management, and displays the image data on the screen or displays the image data in the form of an icon.

Step S48: Subsequently, based on the user's operation, the PC 12 notifies the scanner 14 of an image acquisition request for the third sheet of the image data.

Step S49: Upon reception of the third sheet of the image acquisition request, the scanner 14 again executes the image transmission process.

Step S50: Subsequently, the scanner 14 sends multicast image transmission requests for the third sheet to the file servers 16, 18, and 20 via the network 10.

Step S51: Based on the meta information included in the image transmission request transmitted from the scanner 14, the second file server 18, in which the image data (third sheet) corresponding thereto is saved, starts the image transmission process.

Step S52: The second file server 18 transmits the image data (third sheet) to the scanner 14.

Step S53: The scanner 14 confirms that the image data (third sheet) received via the network 10 is the requested image.

Step S54: Then, the scanner 14 provides (transmits) the requested image data (third sheet) to the PC 12.

Step S55: The PC 12 processes the provided image data (third sheet) on the application for management, and displays the image data on the screen or displays the image data in the form of an icon.

After the above-described steps, the user can use the desired image. The image transmission request is multicast from the scanner 14, and any one of the file servers 16, 18, and 20 in which the corresponding image data is saved transmits the image data in response to the image transmission request. The scanner 14 need not bother to specify one of the file servers 16, 18, and 20 to send the image transmission request. Therefore, the user does not need to know which of the file servers 16, 18, and 20, within the network 10, the necessary image is saved in, and only has to specify the desired image through the PC 12. This makes it possible to easily use the image data.

Note that in the above-described sequence, the image data is saved to the first file server 16, the third file server 20, and the second file server 18 in order in response to the image acceptance request sent by the scanner 14. However, the present invention is not limited to that order and any sequence of servers can be used.

Further, the configuration of the network 10 according to the above embodiment is a mere example, and a device having an area for saving image data may be provided in addition to the file servers 16, 18, and 20.

The above embodiment of the present invention can be summarized as follows. Specifically, according to the embodiment, there is provided a network file processing system comprising:

a scanner device connected to a network, for reading a document and generating image data; and a plurality of file servers connected to the network, each having an area to save data to, in which:

the scanner device comprises:

an acceptance request issuance unit for sending multicast acceptance requests for the image data to the plurality of file servers across the network after generating the image data;

a first data transmission unit for transmitting the image data to at least one of the plurality of file servers that has returned a reading response; and a related information saving unit for saving related information associated with the image data; and the plurality of file servers each comprise:

a response unit for returning the reading response in response to the acceptance request; and a data saving unit for saving the image data transmitted via the network into the area to save data to.

The scanner device comprises a transmission request issuance unit for sending multicast transmission requests for the image data, to which the related information is associated, to the plurality of file servers across the network. The plurality of file servers comprise a second data transmission unit for transmitting the image data to the scanner device via the network in response to the transmission request.

The second data transmission unit determines whether or not the image data, to which the related information is associated, is saved in an area to save data to. If it is saved, the unit transmits the image data to the scanner device via the network.

The scanner device comprises a data providing unit for providing, when receiving the image data via the network, the received image data to an external device.

The transmission request issuance unit sends the transmission requests for the image data with a page number of the image data specified.

The related information includes at least one of a document name, the date and time the document was saved, an owner name, a total page number, a document size, a color mode, and a page number. The related information saving unit saves the related information on a job basis.

The data saving unit saves the image data in association with at least the document name and the page number of the document. The data saving unit saves the image data with a file name including the document name and the page number of the document.

The scanner device further comprises a related information providing unit for providing the related information to an external device via the network.

The image data includes a plurality of images obtained by individually reading a plurality of sheets of the document with the scanner device. The related information includes at least the page numbers of the document which are respectively associated with the individual images.

According to another embodiment of the present invention, there is provided a scanner device, which is connected to a network, for reading a document and generating image data, comprising:

an acceptance request issuance unit for sending multicast acceptance requests for the image data to a plurality of file servers across the network after generating the image data;

a data transmission unit for transmitting the image data to at least one of the plurality of file servers that has returned a reading response; and a related information saving unit for saving related information associated with the image data.

The scanner device comprises a transmission request issuance unit for sending multicast transmission requests for the image data, to which the related information is associated, to the plurality of file servers across the network. The scanner device further comprises a related information providing unit for providing the related information to an external device via the network.

The transmission request issuance unit sends the transmission requests for the image data with a page number of the image data being specified.

In the network file processing system according to an embodiment of the present invention, by reading documents with the scanner device, a large volume of image data can be saved by using a plurality of file servers connected to the network. Further, when the saved image data is to be used, it is only necessary to send the image transmission request from the scanner device to the plurality of file servers, and the desired image data can be transmitted from one of the file servers to the scanner device. The user of the system does not need to specify a save location. Accordingly, the present invention can improve usability of the system, especially if a large volume of the image data are saved in the scanner device.

Note that the image data includes a plurality of images obtained by individually reading a plurality of sheets of the document with the scanner device, and the related information includes at least page numbers of the document which are respectively associated with the individual images.

When the scanner device is to send multicast request for transmission of the image data to the plurality of file servers, it is possible to request for only the image data on a specific page based on the page number of the document contained in the related information. Accordingly, the user can, if desired, use only the image data on the desired page on an external device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A network file processing system, comprising:
   a scanner device connected to a network, for reading a document and generating image data page by page;
   a plurality of file servers connected to the network, each having an area to save data to;
   the scanner device comprises:
   an acceptance request issuance unit for sending, page by page, multicast acceptance requests for the image data to the plurality of file servers across the network after generating the image data;
   a first data transmission unit for transmitting, when a reading response is returned from any one of the plurality of file servers after sending the acceptance requests, the image data of a page corresponding to the reading response to the file server that has returned the reading response firstly;
   a related information saving unit for saving related information associated with the image data; and
   a storing unit for storing the image data that is generated;
   the plurality of file servers each comprise:
   a response unit for returning the reading response in response to the acceptance request; and
   a data saving unit for saving the image data transmitted via the network into the area to save data to, wherein:
   the response unit sends an image deletion notification of the image data of the page to the scanner device after the image data of the page is saved in the data saving unit; and
   the storing unit deletes the image data of the page that is stored in the storing unit after the scanner device receives the image deletion notification from the file server that has returned the reading response firstly, after transmitting the image data of the page.

2. The network file processing system according to claim 1, wherein:
   the scanner device comprises a transmission request issuance unit for sending multicast transmission requests for the image data, to which the related information is associated, to the plurality of file servers across the network; and
   the plurality of file servers comprise a second data transmission unit for transmitting the image data to the scanner device via the network in response to the transmission request.

3. The network file processing system according to claim 2, wherein the second data transmission unit determines whether or not the image data, to which the related information is associated, is saved in an area to save data to, and if saved, transmits the image data to the scanner device via the network.

4. The network file processing system according to claim 2, wherein the scanner device comprises a data providing unit for providing, when receiving the image data via the network, the received image data to an external device.

5. The network file processing system according to claim 2, wherein the transmission request issuance unit sends the transmission requests for the image data with a page number of the image data specified.

6. The network file processing system according to claim 1, wherein the related information includes at least one of a document name, a date and time the document is saved, an owner name, a total page number, a document size, a color mode, and a page number.

7. The network file processing system according to claim 6, wherein the related information saving unit saves the related information on a job basis.

8. The network file processing system according to claim 1, wherein the data saving unit saves the image data of the page in association with at least a document name and a page number of the document.

9. The network file processing system according to claim 1, wherein the data saving unit saves the image data of the page with a file name including a document name and a page number of the document.

10. The network file processing system according to claim 1, wherein the scanner device comprises a related information providing unit for providing the related information to an external device via the network.

11. The network file processing system according to claim 1, wherein:
    the image data includes a plurality of images obtained by individually reading a plurality of sheets of the document with the scanner device; and
    the related information includes at least page numbers of the document which are respectively associated with the individual images.

12. A scanner device, which is connected to a network, for reading a document and generating image data page by page, comprising:
    an acceptance request issuance unit for sending, page by page, multicast acceptance requests for the image data to a plurality of file servers across the network after generating the image data;
    a data transmission unit for transmitting, when a reading response is returned from any one of the plurality of the file servers after sending the acceptance requests, the image data of a page corresponding to the reading response to the file server that has returned the reading response firstly;
    a related information saving unit for saving related information associated with the image data; and
    a storing unit for storing the image data that is generated, wherein
    the storing unit deletes the image data of the page that is stored in the storing unit after the scanner device receives an image deletion notification from the file server that has returned the reading response firstly, after transmitting the image data of the page.

13. The scanner device according to claim 12, comprising a transmission request issuance unit for sending transmission requests for the image data, with which the related information is associated, to the plurality of file servers across the network.

14. The scanner device according to claim 13, wherein the transmission request issuance unit sends the transmission requests for the image data with a page number of the image data specified.

15. The scanner device according to claim 12, further comprising a related information providing unit for providing the related information to an external device via the network.

16. A network file processing system, comprising:
    a scanner device connected to a network, for generating image data page by page;
    a plurality of file servers connected to the network, each having an area to save data to;
    the scanner device comprises: an acceptance request issuance unit for sending, page by page, multicast acceptance requests for the image data to the plurality of file servers across the network after generating the image data, a first data transmission unit for transmitting, when a reading response is returned from any one of the plurality of file servers after sending the acceptance requests, the image data of a page corresponding to the reading response to the file server that has returned the reading response firstly, a saving unit for saving information associated with the image data, and a storing unit for storing the image data that is generated;

the plurality of file servers each comprise a response unit for returning the reading response in response to the acceptance request, and a data saving unit for saving the image data transmitted via the network into the area to save data to, wherein:

the response unit sends an image deletion notification of the image data of the page to the scanner device after the image data of the page is saved in the data saving unit; and the storing unit deletes the image data of the page that is stored in the storing unit after the scanner device receives the image deletion notification from the file server that has returned the reading response firstly, after transmitting the image data of the page.

* * * * *